United States Patent [19]
Weimann et al.

[11] Patent Number: 4,804,687
[45] Date of Patent: Feb. 14, 1989

[54] FOAMED MICROBEADS AND A PROCESS FOR THEIR PREPARATION

[75] Inventors: Norbert Weimann; Manfred Dahm; Ulrich Nehen, all of Leverkusen; Walter Schäfer, Leichlingen, all of Fed. Rep. of Germany

[73] Assignee: Bayer Aktiengesellschaft, Leverkusen, Fed. Rep. of Germany

[21] Appl. No.: 169,567

[22] Filed: Mar. 17, 1988

[30] Foreign Application Priority Data

Mar. 31, 1987 [DE] Fed. Rep. of Germany ....... 3710607

[51] Int. Cl.$^4$ .............................................. C08J 9/36
[52] U.S. Cl. ..................................... 521/53; 264/4.33; 521/56; 521/64; 521/901
[58] Field of Search ...................... 521/56, 53, 64, 901; 264/4.33

[56] References Cited

U.S. PATENT DOCUMENTS

| | | | |
|---|---|---|---|
| 3,575,882 | 4/1971 | Vandegaer et al. | 424/419 |
| 3,577,515 | 5/1971 | Vandegaer | 424/497 |
| 4,089,800 | 5/1978 | Temple | 521/61 |

*Primary Examiner*—Morton Foelak
*Attorney, Agent, or Firm*—Sprung Horn Kramer & Woods

[57] ABSTRACT

Foamed microbeads with a shell and an encased core are characterized in that the shell is a reaction product of an NCO-containing carbodiimide and a polyamine, and the core is at least partly filled with a polymeric carbodiimide or its reaction product with a polyamine, and in that the foamed microbeads are self-supporting and can be laden with hydrophilic and if appropriate hydrophobic liquids.

4 Claims, No Drawings

FOAMED MICROBEADS AND A PROCESS FOR THEIR PREPARATION

The invention relates to foamed microbeads which have an outer shell and a foam-like core.

It is already known that the most diverse substances, so-called core materials, such as, for example, solvents, active compounds and the like, can be encapsulated in so-called microcapsules and microcapsules can be used to save weight because of their low weight. Reference is made to Microencapsulation, Processes and Applications by J. E. Vandegaer, Plenum Press, New York, London 1974. One process for microencapsulation is the interface polyaddition process, in which two components which undergo a polyaddition reaction with one another are dissolved in different immiscible liquids, the polymer being formed at the phase boundary (compare U.S. Pat. No. 3,575,882; U.S. Pat. No. 3,577,515; and U.S. Pat. No. 3,607,776).

In practice, a stable emulsion in which the disperse phase consists of the material to be encapsulated and the first reactant, if appropriate dissolved or emulsified in an additional solvent, and the continuous phase of which is a liquid which is immiscible with the disperse phase, is initially prepared for the microencapsulation. Emulsifying auxiliaries must in general be used here. The second reaction component, which is soluble in the continuous phase, is added to this emulsion. Over a relatively long period of time (sometimes within several hours), shells of the polymer formed by polyaddition or polycondensation are then formed around the dispersed particles of the material to be encapsulated. Suitable pairs of components for this process are, for example, diisocyanates/diols, diisocyanates/diamines, dicarboxylic acid chlorides/diamines, disulphonyl chlorides/diamines or phosgene/diamines.

U.S. Pat. No. A-4,089,800 describes the preparation of microcapsules containing hollow spaces by precipitation of dissolved polymers from a mixture of solvents and non-solvents, in which the non-solvent is initially microencapsulated and if appropriate can then be evaporated off.

If such capsules contain active compounds, these must already be introduced with the liquid mixture before formation of the capsules. Subsequent loading with active compounds is not possible.

The polymers mentioned as wall materials are thermoplastic and are soluble in many solvents, but at least in the solvent used during the preparation. Moderate warming or contact with solvents allows the structure of these microcapsules to collapse, so that their applicability is greatly limited.

U.S. Pat. No. A-3,975,194 describes the preparation of hollow capsules (so-called microballoons) with an inner sponge structure and dense walls by dissolving the wall-forming substance in a solvent which can sublime in the solidified state, by cooling the solution to solidification, after shaping, and by evaporating off the solvent. All the contents (for example pigments) in the capsules thus formed are introduced before formation of the capsule. Subsequent absorption of active compounds is not possible. The sponge structure inside the capsules acts only as a support for the capsule wall. The wall materials mentioned are soluble in many solvents, so that the capsules are not stable in many media.

Japanese Patent Application J 61 091 101-A describes the adsorption of small amounts of liquid active compounds onto large amounts of inorganic microparticles of $Al(OH)_3$, subsequent wetting of these particles with one reaction component of polyurethanes and formation of a polyurethane matrix by addition of the second reaction component. The presence of the inorganic microparticles causes a foamed structure in the polyurethane resin and allows the slow release of the active compound desired. The process does not allow controlled preparation of uniform particles. If necessary, the resin must be divided or ground. Subsequent absorption of active compounds in economic amounts of, for example, >1% of active compound is not possible with these structures.

Encapsulation processes of the type described have some decisive disadvantages. For example, such microcapsules cannot be prepared independently of their contents (the core material), so that they can later absorb and if appropriate release again any desired hydrophilic or hydrophobic substances.

The invention was based on the object of providing corresponding particles which can be prepared independently of so-called core materials and have a sufficient absorption and desorption capacity.

The invention relates to foamed microbeads with a shell and an encased core, characterized in that a. the shell is a reaction product of a polyamine and a carbodiimide which contains at least one NCO group, b. the core is at least partly filled with a polymeric carbodiimide which contains at least one NCO group or its reaction product with a polyamine, preferably with the formation of a foam-like structure, and c. the foamed microbeads are self-supporting and are unladen, but can be laden with hydrophilic and if appropriate hydrophobic substances.

In a preferred embodiment, the shells of the foamed microbeads are folded. The folded structure permits intensive mechanical interlinking of the individual beads to form stable agglomerates of 0.2–10 mm diameter. Such agglomerates have an even more significantly higher absorption capacity than the same weight of the beads of which they are made in the non-agglomerated state. When foamed microbeads are incorporated into solids, the folded surface furthermore effects excellent bonding with the solid composition, so that the beads do not fall out even if they project out of surfaces or fissures.

In another preferred embodiment, the shell contains polyurea and polyguanidine groups. In a preferred embodiment, the foamed microbeads have a diameter of not more than 300 $\mu$m, in particular not more than 30 $\mu$m. In a particularly preferred embodiment, the internal specific surface area of the foamed microbeads, measured by the mercury intrusion porosimetry method, is at least 10 $m^2/g$.

The invention furthermore relates to a process for the preparation of foamed microbeads, characterized in that one part by weight of carbodiimide is dissolved in at least 10 parts by weight of an organic solvent, preferably chloroform, and is crosslinked with a polyamine, after emulsion in an aqueous phase, the solvent is then removed and, if appropriate, the foamed microbeads are dried.

The invention furthermore relates to a process for loading the foamed microbeads according to the invention with a loading substance, characterized in that the foamed microbeads—preferably after drying—are treated with a loading substance, which is preferably in liquid or gaseous form. The invention finally relates to laden foamed microbeads prepared by this process.

Preferred carbodiimides are polyisocyanates containing carbodiimide groups. Particularly suitable starting substances for the preparation of the carbodiimides are hexamethylene 1,6-diisocyanate, 2,2,4- and 2,4,4-trimethyl-1,6-diisocyanatohexane, 1,4-diisocyanatocyclohexane, dicyclohexyl diisocyanate, dicyclohexylmethane 4,4'-diisocyanate, p- and m-xylylene diisocyanate, 1-methyl-2,4'-diisocyanatocyclohexane, 1-methyl-2,6-diisocyanatocyclohexane, 3-isocyanatomethyl-3,5,5-trimethyl-cyclohexyl isocyanate (=isophorone diisocyanate) and lysine ester diisocyanates with 1–8 C atoms in the alcohol radical. Preferred aromatic diisocyanates are, for example: phenylene 1,3- and 1,4-diisocyanate, toluylene 2,4- and 2,6-diisocyanate and any desired mixtures of these isomers, diphenylmethane 2,4'- and/or 4,4'-diisocyanate, naphthylene 1,5-diisocyanate and diisocyanates such as are described in U.S. Pat. No. 3,492,330.

Oligomers of the formula $R(NCO)_m$ where $n \geqq 2$, R denoting a group with molecular weights $\leqq 3,000$ built up from glycols, polyethers and/or polyesters, can furthermore be used.

Examples of preferred polyamines are hydrazine, hydrazino-2-ethanol, ethylene-1,2-diamine, bis-(3-aminopropyl)-amine, bis-(2-methyl-aminoethyl)-methylamine, 1,4-diaminobenzene, 4,4'-diaminodiphenylmethane, 1,4-diaminocyclohexane, 1-aminomethyl-5-amino-1,3,3-trimethylcyclohexane, 3-amino-1-methyl-aminopropane, N-hydroxyethylethylenediamine, N-methyl-bis-(3-aminopropyl)-amine, 1-aminoethyl-ethylene-1,2-diamine, bis-(N,N'-aminoethyl)ethylene-1,2-diamine, 1,4-diamino-n-butane, 1,6-diamino-n-hexane and ethylene-1,2-diamine-N-ethanesulphonic acid (as an alkali metal salt).

Preferred solvents are those which form emulsions with water, have the lowest possible boiling point and have good dissolving properties for polycarbodiimides. Chloroform, methylene chloride and trichloroethylene are preferably used as the solvent. However, all solvents which form emulsions with water and have good solution properties for prepolymers containing carbodiimide, which requires a certain polarity, are suitable. A low boiling point is important for economic reasons. If higher-boiling solvents are used, they can no longer be driven out of the finished beads in the aqueous slurry directly, but must be eluted with preferably water-miscible solvents (acetone, alcohols). Higher-boiling solvents are only preferred if they form azeotropic mixtures with lower boiling points, preferably below 100° C., with water and/or other solvents, such as is the case, for example, with perchloroethylene (tetrachloroethylene).

The carbodiimides are preferably α-diisocyanatopolycarbodiimides which can be prepared in a manner which is known per se from low molecular weight diisocyanates with phospholine oxide. The polycarbodiimides here can be prepared by a "foam process" or by a foam-free process:

Foam process:

A mixture of liquid diisocyanate and 1–2% of phospholine oxide is taken in a suitable vessel. A reaction starts immediately at room temperature, with vigorous formation of $CO_2$. After a few minutes, the mixture starts to foam and increasingly solidifies. The resulting foamed volume is 15–30 l/kg of polycarbodiimide prepolymer, depending on the shape of the vessel. The increase in temperature inside the foam remains limited to $\Delta T \leqq 17$ degrees. After about 20 hours, a brittle foam has formed and can easily be comminuted. Prepolymers which are soluble in chloroform or methylene chloride and have an NCO content of 3–8% are obtained.

If the foam is kept in the open at room temperature, a slow subsequent reaction with crosslinking occurs, which allows the product to become insoluble after a few days. Dry storage at room temperature delays this process for about one week, whereas dry storage at 0° C. maintains the solubility of the prepolymer for about three months.

Foam-free preparation:

The foam-free preparation of the polycarbodiimide allows more easily controllable adjustment of the NCO content or the average molecular weight. The reaction of the diisocyanate is advantageously carried out at elevated temperatures, for example at 55° C., which means that the use of the phospholine oxide can be reduced from about 1.5% to 300 ppm.

The desired NCO content is controlled by measuring the carbon dioxide formed. When the desired value has been reached, the formation of carbodiimide is stopped, for example with n-butylcarbamoyl chloride. The prepolymer melt is dissolved in chloroform under the influence of heat and is discharged, for example, as a 30% strength solution. When cooled, such a solution remains mobile and reactive for many months, but gelling can occur after 3–4 weeks at room temperature.

In the reaction of the polycarbodiimides with the polyamines, all the reaction combinations, that is to say also tri- and tetrafunctional branchings, occur, and subsequent intermolecular reaction of the NH group from the guanidine branching with a carbodiimide group of the adjacent molecules is also possible.

There are close relationships between the properties of the carbodiimide-containing prepolymers and the properties of the foamed microbeads prepared therefrom. The process can easily be carried out continuously or discontinuously. No stoichiometric reaction with polyamines can be stated because of the different crosslinking processes. About 10–12 mol of $NH_2$ groups, for example corresponding to 300–360 g of ethylenediamine, are reacted per 1,000 g of polycarbodiimide prepolymer, depending on the NCO content. However, the process can also be carried out with a high excess of amine or less than the equivalent amount without trouble. The carbodiimide prepolymer is used as a solution for the preparation of the foamed microbeads.

An oil/water emulsion with the desired droplet size is prepared with the solution in water containing at least one protective colloid, and an aqueous polyamine solution is then added. Solvent-containing foamed microbeads form immediately and after a short time can be separated off from the outer phase and if appropriate washed. The solvent is stripped off directly from the slurry or from a concentrated water-moist sludge at the boiling point or in vacuo at correspondingly low temperatures. Acetone, alcohols or other customary defoaming agents can be added for the purpose of defoaming.

If appropriate, the beads which remain are filtered off and are dried at room temperature or at temperatures of up to 130° C.

A fine free-flowing powder of microcapsules which have a folded surface, if appropriate with fine holes of 0.01 to 0.1 μm diameter, is obtained. The inside of the capsule consists of loosely coherent granules of particles of about 1 μdiameter. The capsules are called foamed microbeads.

Depending on the content of agglomerate, preferred foamed microbeads have bulk densities of between 50 and 200 g/l, they are insoluble, swell little and, for example after storage for 24 hours in the solvent, can be dried without forming lumps or collapsing.

If beads with a good absorption capacity are to be formed in this preparation process, the following limit conditions are preferably maintained:

The NCO content of the carbodiimide prepolymers should as a rule be between 3 and 17%, preferably between 5 and 12%.

The concentration of the carbodiimide prepolymer solutions should be between 0.1 and 10%, preferably between 2.0 and 5%.

The droplet size of the emulsion should be less than 300 μm, preferably between 5 and 100 μm and particularly preferably between 15 and 50 μm.

The solvent should be chloroform, trichloroethylene, perchloroethylene or methylene chloride, preferably chloroform.

The foamed microbeads prepared under these conditions have a porous surface and a good absorption capacity. They can be laden in a simple manner with liquids by stirring the liquid and the foamed microbeads with a rod and if appropriate passing the mixture through a coarse sieve for homogenization. The liquids can be solvents, solutions or melts with melting points of up to 120° C. In the case of melts, the beads, vessel and stirring rod must be heated to 10°-20° C. above the melting point and allowed to draw for about 30 minutes. The beads absorb liquid up to their own weight without losing their free-flowing properties or their appearance as a dry powder. Loading with solids can be effected via solutions by subsequently evaporating off the solvent.

After loading, foamed microbeads according to the invention can contain, whilst having good free-flowing properties, for example: 50% of water, 50% of isopropanol, 50% of cyclohexane, 50% of methanol, 30% of maize oil, 30% of silicone oil, 33% of methylparathion or 21% of sodium chloride.

Laden and non-laden beads are, inter alia, readily dispersible in various solvents, such as, for example, water, isopropanol, nitrobenzene or cyclohexane. When laden with various active compounds, foamed microbeads can also be used effectively as powders. Thus, an insect repellant is released uniformly at 37° C. for 50 hours. Absorbed deodorant oils act as air fresheners under a high loading in small doses, and perfumes for powder formulations experience outstanding stabilization of their fragrance notes in foamed microbeads.

Finally, foamed microbeads can be interlinked mechanically by a special treatment during drying to give stable agglomerates of 200-10,000 μm, preferably 200 to 1,000 μdiameter. The capacity for loading agglomerates with the abovementioned liquids rises to 70 to 80%, coupled with good free-flowing properties.

Foamed microbeads can also be used effectively as individual beads or in agglomerated form as porosity-imparting agents, for example by being admixed as a powder or as a water-moist or solvent-moist formulation to one or more components for the production of shaped articles. Examples which may be mentioned are: casting resin systems, liquid concrete, gypsum, paper and plastics.

In cases of use where extreme absorption properties are not required, the pattern of properties of the foamed microbeads can be modified in a controlled manner by other preparation parameters.

For example, if a prepolymer with a reduced NCO content and a correspondingly increased molecular weight is used, as the NCO content decreases initially only the absorption capacity of the foamed microbeads decreases, without the roughness of the folded surface of the opacity of the beads changing.

Another important parameter is the concentration of the prepolymer solution which forms the inner phase of the oil/water emulsion in the preparation of the foamed microbeads. When a carbodiimide-containing prepolymer with NCO contents of between 5 and 12% is used, foamed microbeads according to the invention with a very high absorption capacity are obtained if the concentrations of the solutions used are 5% or less down to about 0.8%. In the solution concentration range of 5-10%, the absorption capacity of the beads prepared therefrom decreases to zero as the concentration increases. The surface roughness decreases in the same sense, but beads which have been prepared with 10% strength solutions are not completely smooth but still have a slight roughness.

The diameter of the foamed microbeads can be adjusted within wide limits for various applications. Towards large diameters, for example from 300 μm, deviations from the spherical shape in the form of dishes increasingly arise. This phenomenon can be largely suppressed by suitable measures, for example by reducing the concentration of the organic phase during the emulsification. However, the absorption capacity of the particles is not substantially influenced by this deformation. Larger absorbent particles in the millimeter range, for example for dry formulation of liquid components, such as foam suppressants or fragrances in washing powder, will be achieved more advantageously and effectively by mechanical interlinking of smaller beads.

Foamed microbeads in the average diameter range of 10-100 μm are preferably used as an absorbent medium in the dry formulation of liquids, such as, for example, fragrances for air fresheners or as porosity-imparting agents in shaped articles.

In the diameter range below 10 μm, preferably in the range from 1 to 5 μm, foamed microbeads can advantageously be used as pigments and lightweight fillers in papermaking. By adjusting the absorption capacity of the pigments, the absorbancy of the paper produced therefrom, for example, can be influenced.

EXAMPLE 1

Polycarbodiimide by the Foam Process

A mixture prepared shortly beforehand at room temperature (23° C.) of 695 g of a toluylene diisocyanate mixture and 10 g of phospholine oxide is introduced into a paper box with a base area of 40 cm×32 cm. The liquid spreads over the base of the box and immediately starts to form gas bubbles. After 25 minutes, a tacky foam with a height of 12 cm has formed. The temperature, measured 2 cm above the base, has risen to 33° C. and then decreases slowly to room temperature. After 12 hours, a brittle open-pored foam has formed, which can easily be comminuted with a spatula or spoon. The average NCO content of the granules is 6.3%.

EXAMPLE 2

Polycarbodiimide, Preparation in a Liquid Phase 50 kg of a toluylene diisocyanate mixture are taken at 55° C. in a stirred kettle which can be heated. 560 ml of a 3% strength solution of phospholine oxide in toluene are added, with thorough stirring, and the kettle is closed apart from a gas outlet. The amount of $CO_2$ issuing from the kettle is measured with a gas meter. After 290 minutes, the desired amount of 228 mol of $CO_2$ is reached. To end the reaction, 3,000 g of a 13% strength solution of n-butylcarbamoyl chloride in chloroform is added via a pressure sluice. For this, the gas outlet is closed briefly. After addition of the stopping agent, no further formation of gas is observed. 40.2 kg of a polymer which contains carbodiimide groups and has a residual NCO content of 12.1% are formed and are diluted with chloroform to form a 33% strength stock solution which is cooled to room temperature.

EXAMPLE 2b 192 g of a toluylene diisocyanate mixture are mixed with 50 mg of a 10% strength solution of phospholine oxide in toluene at room temperature, with stirring, in a 1 l stirred vessel which can be heated. The mixture is heated up to 55° C. in the course of 42 minutes and is then kept at this temperature.

The amount of $CO_2$ issuing from the vessel is determined with a gas meter. After 135 minutes, the desired amount of 0.75 mol of $CO_2$ is reached.

The carbodiimidization reaction and the associated formation of $CO_2$ is ended by addition of 11 g of a solution of 9.1% of n-butylcarbamoyl chloride in chloroform. 159 g of a prepolymer which contains carbodiimide groups and has a residual NCO content of 15.9% are formed. The slightly yellowish solution is allowed to cool to room temperature and is diluted by addition of 587 g of chloroform to form a 26.8% strength stock solution.

EXAMPLE 3

Continuous Preparation of Foamed Microbeads

In each case sufficient amounts of the following components are prepared:
I. Aqueous solution of polyvinyl alcohol, c=0.25%
II. Solution of polymer according to Example 1 in chloroform, c=2.46%
III. Mixture of ethylenediamine in water, c=10%

60 kg/hour of solution I and 40 kg/hour of solution II are mixed in an emulsifying apparatus for continuous throughput to form an oil/water emulsion so that the top droplet size reached in the organic phase II is 50 μm in diameter. The emulsion is fed continuously via pipelines through a closed 6 l reaction vessel with crossbeam stirrers and is mixed there with solution III delivered in an amount of 12 kg/hour.

The processes take place at room temperature. Only the supply of energy in the emulsion stage causes an increase in temperature of a few degrees of temperature.

In another discontinuous process step, 100 ppm of foam suppressant Baysilon 100 are added to 500 l of the dispersion prepared, the mixture is heated in a closed kettle (800 l), with stirring, and the chloroform is driven off in the temperature range of 58°-80° C. over a pipe bridge in the course of 4 hours and is condensed.

The aqueous dispersion which remains contains spherical foamed microbeads with diameters of 10-30 μm formed from the reaction product of ethylenediamine and the polymer according to Example 1. The core consists of a loose foam-like material, the surface is folded to a high degree and porous and, after the chloroform has been driven off, the hollow spaces of the particles are filled with water.

EXAMPLE 4

For discontinuous preparation of foamed microbeads, 15,650 g of an aqueous solution of polyvinyl alcohol with a concentration of 0.25% are taken in a 60 l vat at room temperature. 784 g of the solution from Example 2 are diluted with 9,917 g of chloroform to form the organic phase. An oil-in-water emulsion with a droplet diameter of 12–50 μm is prepared from the organic phase and the polyvinyl alcohol solution taken.

5 minutes after the start of the experiment, 3,652 g of an aqueous ethylenediamine solution with a concentration of 2.5% are added and stirring is continued for up to 20 minutes after the start of the experiment.

The vat is topped up with water, and after the beads have settled the clear supernatant solution is drawn off. This process is repeated twice and the vat is topped up again.

The dispersion is then transferred to a pressure kettle with a stirrer and the chloroform is stripped off with vigorous stirring at 28° C. with a reduction in the pressure from 1,000 to 100 mbar, until, after about 35 minutes, water passes over.

The remaining dispersion is concentrated to a sludge-like consistency by drawing off the supernatant water.

To dry the beads with no agglomerates, the sludge is dried under normal pressure at 100° C. for 2.5 hours and then passed through a sieve with a mesh width of 1,000 μm. After a further drying phase at 100° C. for 9 hours, the mixture is sieved again with a mesh width of 180 μm. The loose agglomerates formed in this process thereby disintegrate without residues to give a powder of individual beads of 8-33 μm diameter which has good free-flowing properties.

EXAMPLE 5

50 g portions of the powder prepared in Example 4 are mixed in glass beakers on the one hand with 50 g of water and on the other hand with 50 g of cyclohexane by stirring with a glass rod. After 5 minutes, the foamed microbeads have absorbed the liquids completely, so that powders which have good free-flowing properties and do not differ externally from the non-laden powder have been formed.

EXAMPLE 6

15,650 g of an aqueous solution of polyvinyl alcohol with a concentration of 0.25% are taken in a 60 l vat. 261 g of an NCO-containing polycarbodiimide according to Example 1 are dissolved in 5,217 g of chloroform to form the organic phase. An oil-in-water emulsion with a top droplet size of 240 μm is prepared from the organic phase and the polyvinyl alcohol solution taken.

5 minutes after the start of the experiment, 3,652 g of a 10% strength aqueous ethylenediamine solution are added and stirring is continued up to 25 minutes after the start of the experiment.

The vat is topped up with water, and after the beads have settled the clear supernatant solution is drawn off. This operation is repeated twice and the vat is topped up again.

The dispersion is then transferred to a pressure kettle with a stirrer and the chloroform is stripped off with stirring, while slowly increasing the temperature from 21° C. to 85° C. and reducing the pressure to 720 mbar, until, after about 105 minutes, water passes over. The remaining dispersion is filtered and the residue on the filter is dried at 100° C. in a drying cabinet.

An agglomerate-free powder of foamed microbeads with a bulk density of 206 g/l and consisting of beads of between 20 and 180 μm diameter is formed.

EXAMPLE 7

Foamed microbeads from Example 6 are loaded in the same way as in Example 5. In both cases, the laden powders and the non-laden powder have equally good free-flowing properties.

The laden and non-laden powders can be dispersed both in water and in cyclohexane by gentle shaking.

In cyclohexane, all the three powder samples sediment after a few minutes, and in water the non-laden powder and the powder laden with water sink, whereas the powder laden with solvent floats slowly to the surface.

EXAMPLE 8

300 g of a 0.25% strength aqueous solution of polyvinyl alcohol are taken in a 1 l glass beaker. 5 g of a polycarbodiimide according to Example 1, the NCO content of which has fallen to an NCO content of 4.8% after dry storage at room temperature for 4 weeks, are dissolved in 180 g of methylene chloride to form the organic phase.

An oil-in-water emulsion with a top particle diameter of 50 μm is prepared from the organic phase and the polyvinyl alcohol solution taken. 3 minutes after the start of the experiment, 70 g of a 10% strength aqueous ethylenediamine solution are added and the mixture is stirred for a further 2 minutes.

Thereafter, the dispersion is warmed carefully to 80° C. in order to drive off the solvent.

The dispersion which remains is spray-dried in a laboratory spray drier. A powder of foamed microbeads with a diameter of 10-30 μm and a folded surface is obtained. The beads in part form agglomerates of up to 115 μm diameter. The bulk density is 60 g/l. The absorption capacity for water is slightly reduced, that is to say free-flowing properties exist only up to a loading of 30% (3 parts of water per 7 parts of foamed microbeads).

EXAMPLE 9

The procedure is as in Example 6, with the following deviations:

A polycarbodiimide according to Example 1, the NCO value of which had fallen to 3% after dry storage at room temperature for 6 weeks, was used, and the emulsification was carried out for 15 minutes.

The resulting foamed microbeads had diameters of 5 to 41 μm. The beads were round and had folded surfaces.

The absorption capacity of the beads was reduced. Beads with a loading of 50% (1 part of liquid per 1 part of foamed microbeads) as described in Example 5 or 7 gave a lumpy mass which was not free-flowing. Free-flowing properties were obtained only up to a loading of 30% (3 parts of liquid per 7 parts of beads).

EXAMPLE 10

125 g of a 0.25% strength aqueous solution of polyvinyl alcohol are taken in a 1 l glass beaker. 6.73 g of a polycarbodiimide according to Example 1 are dissolved in 269 g of chloroform to form the organic phase.

An oil-in-water emulsion with a top droplet size of 300 μm is prepared from the organic phase and the polyvinyl alcohol solution taken.

After the start of the experiment, 4.72 g of a 50% strength aqueous ethylenediamine solution are added and stirring is continued.

After the beads have settled in the dispersion, they are washed free from polyvinyl alcohol by adding water twice and drawing off the supernatant clear solution with suction.

After the last topping up with water, the dispersion is heated slowly to 80° C. to drive off the solvent.

The remaining dispersion is filtered and the beads isolated are dried at 90° C. for 2 hours and passed through a sieve of 500 μm mesh width. The residual moisture is then removed over 10 hours at 90° C.

An agglomerate-free powder of foamed microbeads of 23-240 μm diameter which has good free-flowing properties is obtained. The beads are opaque and have rough surfaces. Some beads show the dish shape typical of these diameter values.

The absorption capacity of these foamed microbeads is excellent. After loading in accordance with Example 5, both samples show the excellent free-flowing properties of the non-laden powder. Moreover, a laden powder with 70% of water (7 parts of water and 3 parts of foamed microbeads) still shows good free-flowing properties.

EXAMPLE 11

250 g of a 0.25% strength aqueous solution of polyvinyl alcohol are taken in a 1 l glass beaker at room temperature. 33.4 g of the stock solution according to Example 2b are mixed with 333.2 g of chloroform to form the organic phase.

An oil-in-water emulsion with a top droplet size of 60 μm diameter is prepared from the organic phase and the polyvinyl alcohol solution taken.

After the emulsification, the emulsion is kept agitated with a laboratory stirrer at 500 revolutions per minute.

7 minutes after the start of the experiment, 6.28 g of a 50% strength aqueous ethylenediamine solution are added and the mixture is stirred for a further 53 minutes.

After a waiting time of 14 hours, 60 mg of foam suppressant are added to the dispersion and the chloroform is distilled off at 58°-60° C. with gentle stirring. The remaining dispersion is filtered and the beads isolated are dried at 130° C. for a total of 4 hours. The drying operation is interrupted twice for a short time by sieving operations: after the first hour, the beads are passed through a sieve of 1,000 μm mesh width, and after the second hour they are passed through a sieve of 250 μm mesh width.

A fine free-flowing powder with a bulk density of 147 g/l and a very good absorption capacity, the determination of which is described in Example 5, is obtained. The foamed microbeads are round and opaque with a folded surface and have diameters of 7-40 μm. About 20% of the beads are agglomerated to particles of up to 120 μm diameter.

EXAMPLE 12

250 g of a 0.25% strength aqueous solution of polyvinyl alcohol are taken in a 1 l glass beaker at room temperature.

6.7 g of a polycarbodiimide according to Example 1 are dissolved in 268 g of chloroform to form the organic phase.

An oil-in-water emulsion with a top droplet size of 50 μm diameter is prepared from the organic phase and the polyvinyl alcohol solution taken.

After the start of the experiment, 57.2 g of a 4.1% strength aqueous ethylenediamine solution were added and stirring was continued. After the beads have settled, the dispersion is washed by adding water twice and drawing off the supernatant clear solution with suction. After the last topping up with water, the chloroform is driven off by heating the dispersion slowly up to 80° C. The remaining dispersion is spray-dried.

A free-flowing, agglomerate-free powder with a good absorption capacity, characterized by good free-flowing properties of the powders laden with water or cyclohexane according to Example 5, is obtained.

The foamed microbeads are round and opaque with a surface with a high degree of folding, and have diameters of 9–32 μm.

EXAMPLE 13

The procedure is as in Example 12, with the deviation that the organic phase is used with twice the concentration of polycarbodiimide and with the amount of ethylenediamine equivalent to this polycarbodiimide.

After drying, a free-flowing agglomerate-free powder is obtained.

Loading with 1 part of water per 1 part of foamed microbeads, as described in Example 5, gives a powder with good free-flowing properties. Corresponding loading with cyclohexane, however, leads to a crumbly mass which is not free-flowing. A powder with good free-flowing properties is obtained only with a loading of 3 parts of cyclohexane per 7 parts of foamed microbeads. In comparison with the foamed microbeads from Example 12, the absorption capacity of the foamed microbeads obtained in this example is in part limited. The foamed microbeads obtained are round and opaque with a wrinkled, slightly folded surface and have diameters of 9–32 μm.

EXAMPLE 14

The procedure is as in Example 12, with the deviation that the organic phase is used with 2.6 times the concentration of polycarbodiimide and with the amount of ethylenediamine equivalent to this polycarbodiimide.

After drying, a free-flowing agglomerate-free powder is obtained.

Loading with 1 part of water per 1 part of foamed microbeads, as described in Example 5, gives a powder with reduced free-flowing properties. Corresponding loading with cyclohexane leads to a crumbly mass which is not free-flowing. A free-flowing powder is obtained with a loading of 3 parts of cyclohexane per 7 parts of foammed microbeads. In comparison with the foamed microbeads from Example 13, the absorption capacity of the foamed microbeads obtained in this example is reduced further.

The resulting foamed microbeads are round, in some cases have collapsed to form a dish, and are opaque with a rough surface and have diameters of 9–39 μm.

EXAMPLE 15

22,000 g of an aqueous solution of polyvinyl alcohol with a concentration of 0.5% are taken in a 60 l vat. 150 g of an NCO-containing polycarbodiimide according to Example 1 are dissolved in 6,000 g of chloroform to form the organic phase. An oil-in-water emulsion with a top droplet size of 11 μm diameter is prepared from the organic phase and the polyvinyl alcohol solution taken.

15 minutes after the start of the experiment, 1,830 g of an aqueous 10% strength ethylenediamine solution are added. Crosslinking is carried out under emulsification conditions up to 20 minutes after the start of the experiment.

The dispersion is then transferred to a pressure kettle with a stirrer and the chloroform is stripped off while stirring at 30° C. and while reducing the pressure from 1,000 to 160 mbar. The mixture is then heated slowly to 85° C. while increasing the pressure to 320 mbar, until, after 120 minutes, 1,100 g of water have passed over, in addition to the chloroform.

The dispersion is left to stand for three days to settle and the supernatant clear solution is then drawn off. The vat is topped up again with water, and after sedimentation the clear supernatant solution is drawn off again. The sediment is thickened to a viscous sludge with a solids content of 6.9% in a distillation apparatus.

The resulting sludge is extremely thixotropic, that is to say it flows only with gentle vibration. Under increased shearing forces, for example during stirring, it becomes solid and may form cracks.

After dilution to a solids content of 6.0%, a viscous dispersion which shows only a slight increase in viscosity on stirring is obtained. Such dispersions are suitable as lightweight fillers in papermaking or as white pigment for coating base paper.

A portion of the dispersion was dehydrated with isopropanol, dried and passed through a sieve of 80 μm mesh width. A powder with flow properties, a bulk density of 37 g/l and a good absorption capacity, characterized by loading with water and cyclohexanone, as described in Example 5, is obtained. The individual foamed microbeads have a sponge-like to angular shape and have a surface with a high degree of folding, are completely opaque and have diameters of 1.5 to 7.5 μm. As a result of the drying process, a high proportion of the foamed microbeads form agglomerates of up to 80 μm diameter.

What is claimed is:

1. A process for the preparation of foamed microbeads in which a NCO-containing polycarbodiimide is dissolved in at least 10 parts by weight of an organic solvent, the solution is emulsified in an aqueous phase, the polymer is crosslinked with a polyamine and the solvent is removed.

2. A process for the preparation of foamed microbeads in which a NCO-containing polycarbodiimide is dissolved in at least 10 parts by weight of an organic solvent, the solution is emulsified in an aqueous phase, the polymer is crosslinked with a polyamine and the solvent is removed and the foamed microbeads are dried.

3. A process according to claim 1, in which chloroform is used as the solvent.

4. A process for preparing loaded foamed microbeads, in which a NCO-containing polycarbodiimide is dissolved in at least 10 parts by weight of an organic solvent, the solution is emulsified in an aqueous phase, the polymer is crosslinked with a polyamine, the solvent is removed and the foamed microbeads are treated with a loading substance.

* * * * *